(12) United States Patent
Cavelier et al.

(10) Patent No.: US 12,399,053 B2
(45) Date of Patent: Aug. 26, 2025

(54) SYSTEM FOR DETECTING A FILLING STATE OF A DIFFUSER VIAL

(71) Applicant: Ceva Santé Animale, Libourne (FR)

(72) Inventors: Brice Cavelier, Toulouse (FR); Marc Capdevielle, Toulouse (FR); Flavien Joly, Toulouse (FR)

(73) Assignee: Ceva Sante Animale, Cedex (FR)

(*) Notice: Subject to any disclaimer, the term of this patent is extended or adjusted under 35 U.S.C. 154(b) by 265 days.

(21) Appl. No.: 18/010,046

(22) PCT Filed: Jun. 18, 2021

(86) PCT No.: PCT/EP2021/066685
§ 371 (c)(1),
(2) Date: Dec. 13, 2022

(87) PCT Pub. No.: WO2021/255274
PCT Pub. Date: Dec. 23, 2021

(65) Prior Publication Data
US 2023/0341252 A1 Oct. 26, 2023

(30) Foreign Application Priority Data
Jun. 18, 2020 (FR) ..................................... 2006355

(51) Int. Cl.
*G01F 23/292* (2006.01)
*G08B 21/18* (2006.01)

(52) U.S. Cl.
CPC ....... *G01F 23/2925* (2013.01); *G08B 21/182* (2013.01)

(58) Field of Classification Search
CPC .. G01F 23/2925; G01F 23/292; G08B 21/182
See application file for complete search history.

(56) References Cited

U.S. PATENT DOCUMENTS

| | | | |
|---|---|---|---|
| 2015/0297779 A1* | 10/2015 | Conroy | B05B 7/262 239/74 |
| 2017/0340147 A1* | 11/2017 | Hambrock | G16H 20/60 |
| 2020/0352245 A1* | 11/2020 | Otiaba | G01F 23/2921 |

FOREIGN PATENT DOCUMENTS

| | | |
|---|---|---|
| WO | 2007/138247 A1 | 12/2007 |
| WO | 2010/080340 A1 | 7/2010 |
| WO | 2019/115996 A1 | 6/2019 |
| WO | 2020/016022 A1 | 1/2020 |

OTHER PUBLICATIONS

International Search Report for corresponding PCT Application No. PCT/EP2021/066685 mailed Sep. 10, 2021.

* cited by examiner

*Primary Examiner* — Xin Y Zhong
(74) *Attorney, Agent, or Firm* — Wood, Phillips, Katz, Clark & Mortimer (57) ABSTRACT

The invention relates to a system (1, 100) for detecting a filling state of a vial (22, 220) of a diffuser (2, 200), the vial containing a product intended to be diffused, the system comprising an acquisition unit (3, 300) provided with an optical sensor (4, 400*b*) intended to be arranged opposite the vial in order to acquire at least one light beam that has passed through the vial, a processing unit (5, 450) designed to detect, from the light beam, whether a filling level (n) of the vial is lower than a predetermined threshold, and a communication unit (6, 460) designed to send a notification (N) regarding the filling level to a remote electronic device (8, 800) depending on said detection.

11 Claims, 6 Drawing Sheets

SYSTEM FOR DETECTING A FILLING STATE OF A DIFFUSER VIAL

FIELD OF THE INVENTION

Background of the Invention

The invention relates to the field of diffusers of volatile products. More precisely, the invention relates to a system for detecting a filling state of a diffuser vial.

Brief Summary of the Invention

A diffuser makes it possible to diffuse a volatile product in the air, in a generally confined space, for example in order to diffuse an insecticide, a room fragrance, an essential oil intended for aromatherapy, or indeed a composition intended to prevent a medical or behavioral stress problem in a pet such as a dog or a cat.

The product to be diffused is generally contained in a vial which can for example be installed in a diffusion member provided with a male electrical plug, in the case of an electrical diffuser. The user thus plugs the diffuser into a female electrical wall socket, and the diffusion member then diffuses the product contained in the vial. The vial empties as the product diffuses, at the end of which time it is necessary to replace the empty vial with a new refill.

It has been found that the diffuser users cannot easily access the filling state of the vial, which can be ascertained only visually. They must furthermore periodically check this state in order to be able to replace an empty vial, or indeed order a new vial before the vial in use is empty.

These limitations thus lead to poor observance, by the users, of the continuous use of diffusers. For example, in the field of the prevention of stress of a pet, it has been found that, on average, the users use only two vials per year, whereas the duration for complete diffusion of the product contained in a vial is only one month. However, the anticipated benefits of the diffusion of a product generally appear only after a long period of continuous diffusion, in particular in the case of aromatherapy or in the case of the prevention of stress in a pet. The poor observance caused by these limitations thus does not allow for these benefits to be achieved.

It has been envisaged to send a notification to users, at the end of a predetermined period corresponding to a theoretical duration of complete diffusion, in order to tell them to change the vial. However, this solution is not satisfactory, insofar as the duration for complete diffusion varies depending on the type of product, the type of technology, and/or the type of wick used by the diffuser, and the atmospheric conditions of the room in which the diffuser is installed.

There is thus a need for a system which allows a user of a diffuser to be able to replace the diffuser vial when it is empty, and to be able to order a refill before the vial is empty, in order to allow for continuous use of the diffuser. The invention is located in this context and aims to respond to this need.

For these purposes, the object of the invention is a system for detecting a filling state of a diffuser vial, the vial containing a product intended to be diffused, the system comprising an acquisition unit provided with an optical sensor intended to be arranged opposite the vial in order to acquire at least one light beam that has passed through the vial, a processing unit designed to detect, from said light beam, whether a filling level of the vial is lower than a predetermined threshold, and a communication unit designed to send a notification regarding said filling level to a remote electronic device depending on said detection.

The optical sensor can for example be capable of acquiring an image of the vial, said image being generated by a natural or ambient light beam, or indeed generated by a dedicated source, passing through the vial or capable of acquiring a directive light beam passing through the vial. The acquisition unit may for example be intended to be mounted on the diffuser in order to be positioned so as to acquire said light beam passing through the vial. In a variant, the acquisition unit may be integrated in the diffuser and be arranged there so as to acquire said light beam passing through the vial. It is thus understood that the optical sensor is arranged in the acquisition unit so as to acquire said light beam passing through the vial in the region of a position corresponding to the position of the vial. The use of an optical sensor is particularly advantageous insofar as, when the vial is at the end of its use, obtaining information on the quantity of product remaining by means of other types of sensors, for example by weighing, is complicated. The optical sensor is thus arranged so as to acquire said light beam passing through the vial in a periodic manner, for example once a day. In this way, the processing unit can regularly detect the filling state of the vial relative to a predetermined threshold, and the communication unit can transmit a notification on a smartphone or a digital tablet of the user, indicating to them the filling state of the vial relative to said threshold, or indeed the filling level per se, and thus, in other words, the quantity of product remaining in the vial, for example expressed in percent, or indeed alerting them to the need to replace the vial, as soon as possible or after a duration which can be reliably defined.

According to the invention, the diffuser may be an electrical diffuser. For example, the diffuser may comprise a male electrical plug intended to cooperate with a female electrical wall socket, a diffusion member, and a vial, which is mounted on the diffusion member such that it can be dismantled, said vial containing a product which is intended to be diffused. In a variant, the diffuser may comprise a base that is intended to rest on a plane surface and/or may comprise an electrical energy source, such as a rechargeable electric battery or a battery. The vial can in particular comprise a body having a base wall, and a wick arranged in the vial by being plunged into the product in order to cause it to rise, by capillary action, towards the diffusion member of the diffuser. The diffusion member may be arranged so as to diffuse the product contained in the vial, when it is electrically powered, for example by ultrasound or by evaporation. It may for example comprise a heating resistor or a piezoelectric plate. In another variant, the diffusion member may be arranged so as to diffuse the product contained in the vial, when it is electrically powered, by spraying (or microdiffusion), or by ventilation. If applicable, the diffusion member may comprise a compressor and a spray head or a ventilator and a pad intended to be soaked with said product.

According to another embodiment, the diffuser may be a portable diffuser, operating without electricity.

In a non-limiting manner, the product may be an insecticide or an insect repellant, a disinfectant, an antiseptic, a mold inhibitor, a fragrance, an essential oil, an odor eliminator, an air freshener, a composition comprising pheromones (for example intended for cats), or a product having an equivalent composition, or a combination of a plurality of said products.

In a preferred embodiment of the invention, the optical sensor is an infrared light sensor, and the acquisition unit comprises an infrared light emitter intended to be arranged opposite the vial facing the infrared light sensor, and is arranged so as to emit at least one infrared light beam through the vial towards the optical sensor. For example, the infrared light emitter may be an infrared light-emitting diode, and the optical sensor may be a phototransistor. If applicable, the processing unit is arranged so as to determine that the filling level of the vial is below said predetermined threshold when the optical sensor receives said infrared light beam. The detection can for example be performed by a processing unit, when it observes that the light intensity of a light beam received by the optical sensor exceeds a given threshold. It will be noted that, if the level of the liquid extends above the normal optical pathway of the light beam emitted by the emitter, said beam is refracted by the liquid when it passes through the vial, and the optical sensor does not receive it. It is thus possible to detect that the level of the liquid is above a position associated with said sensor, which thus determines said detection threshold of the processing unit. Vice versa, if the level of the liquid drops below the normal optical pathway of the light beam, said light beam thus undergoes substantially no deflection and the optical sensor receives it. It is thus possible to detect that the level of the liquid is below a position associated with said sensor.

Advantageously, the infrared light emitter and the infrared light sensor are intended to be arranged opposite a side wall of the vial and adjacently to a lower wall of the vial. In other words, the detection threshold of the processing unit corresponds to a substantially empty vial, and the notification emitted by the communication unit can thus indicate an empty or non-empty state of the vial and be, if applicable, associated with a filling instruction for the vial.

Still advantageously, the acquisition unit comprises two infrared light sensors intended to be arranged opposite the vial in two different locations, in particular at the same height, and two infrared light emitters each intended to be arranged opposite the vial facing one of the infrared light sensors, and arranged so as to emit at least one infrared light beam through the vial towards said optical sensor. For example, the sensor-emitter pairs may be intended to be arranged on either side of a diametrical plane of the vial. These features in particular make it possible to detect the filling state of a vial, whatever the inclination of the vial.

According to an example, the optical sensor may comprise a plurality of emitters, each capable of emitting a light beam, in particular infrared, intended to pass through the vial at a given point, and a plurality of sensors, each arranged so as to receive a light beam emitted by one of the emitters with which it is associated. For example, each emitter and each associated sensor may be arranged on either side of the recess, facing one another, and the different emitter-sensor pairs may be arranged at different levels relative to one another. Each sensor-emitter pair thus defines a threshold, and the processing unit can determine whether the liquid level is below or above said threshold. This is how the filling level of the vial is estimated.

The acquisition unit preferably comprises a control module which is arranged so as to periodically trigger the emission, by the emitter, of said infrared light beam.

In an alternative embodiment of the invention, the optical sensor is arranged so as to acquire an image of the vial, and the processing unit is arranged so as to determine a filling level of the vial from said image.

For example, the optical sensor may be a camera.

The acquisition unit advantageously comprises a light source which is capable of illuminating the vial when the acquisition unit is mounted on the diffuser.

In one embodiment of the invention, the processing unit is arranged so as to select, from the image acquired by the optical sensor, a filling level of the vial from a set of predetermined filling levels. For example, the predetermined filling levels may range between an "empty" level and a "full" level. If desired, the processing unit is arranged so as to implement pre-processing operations for the image acquired by the optical sensor, and in particular operations of resizing, subsampling and/or conversion into black and white. Preferably, the processing unit may be arranged so as to determine, from the image acquired by the optical sensor, a state of the vial, for example an "incorrectly positioned" state, or the absence of a vial.

Advantageously, the processing unit is arranged so as to implement a classifier which is capable of classifying the image acquired by the optical sensor, from a knowledge base comprising a plurality of classes each comprising one of the filling levels of said set represented by a tag, the classifier having been trained by means of a machine learning algorithm.

A classifier denotes a computer program, the role of which is to decide the class to which a new object, provided at the input, belongs, depending on learned information. The membership class is determined by applying decision rules (also referred to as a knowledge base) which have themselves been previously learned on the basis of learning data.

The machine learning phase consists in splitting (or separating) the representation space, by virtue of boundaries, and in assigning class tags to the regions thus formed. The development of the knowledge base, i.e. the machine learning of the classifiers, thus consists in looking for said decision boundaries. The region where a characteristics vector is located determines its membership class. For example, the machine learning algorithm could consist in providing, in advance, a set of images of vials having different filling states, and in training the classifier to assign, to each image, a tag representing one of the filling levels, then in showing it the actual filling level of said image, such that the classifier itself defines the optimum decision boundaries for this set of images.

By way of non-limiting example, the classifier could be one or more or a combination of the following classifiers; a neural network, a decision tree, a vector/machine support, a data partitioning or grouping algorithm. Still in a non-limiting manner, the classifier could be trained using a machine learning algorithm of the supervised, unsupervised, semi-supervised type, by reinforcement, or by transfer.

In a variant, the processing unit could be arranged so as to determine, from the image acquired by the optical sensor, a value of a filling level of the vial. If applicable, the processing unit could be arranged so as to implement an image processing algorithm or a regressor which is capable of predicting a filling level value from the image acquired by the optical sensor and on the basis of a filling level model previously established by means of a machine learning algorithm.

In a preferred embodiment of the invention, the acquisition unit comprises a housing defining a recess that is intended for receiving the vial, at least in part, and comprising a fixing member for fixing the housing to the diffuser. For example, the fixing member may be a fixing member for fixing the housing to the vial or, in a variant, a fixing member for fixing the housing to another part of the diffuser, in particular the male electrical plug or the diffusion member. If applicable, the optical sensor may be arranged in the housing so as to be opposite a side wall of the vial when the vial is received in the recess.

For example, the housing may be provided with an opening through which the vial can be inserted into the recess, the edge of the opening being elastically deformable such that the vial can be inserted into the recess by deforming said edge, which then resists the removal of the vial from the recess. The acquisition unit thus forms a module that is independent of the diffuser, which is mounted on the diffuser, without the need to modify the vial. Preferably, the recess is intended to receive a lower part of the vial opposite an upper part which is mounted on the diffusion member of the diffuser. If desired, the housing may for example be ring-shaped, the vial thus being inserted between said ring and the diffusion member.

In a variant, the edge of the opening is provided with one or more elastically deformable tabs which form the fixing member. In other words, the tabs allow the vial to be inserted into the recess, and resist removal of the vial from said recess.

Advantageously, the housing comprises a peripheral wall which laterally delimits the recess, said peripheral wall comprising a side gap, the optical sensor being arranged opposite said gap.

For example, the recess of the housing intended for receiving the vial is defined by the side wall, an edge of which defines the opening, and a base wall opposite the opening and closing the recess. The housing of the acquisition unit may comprise a compartment, formed adjacently to the base wall or, in a variant, formed by the peripheral wall, and in which an electronic circuit board is arranged, on which board the optical sensor is mounted.

If wished, the housing may comprise a cavity extending from the gap, and the optical sensor may be arranged in said cavity. If applicable, the optical sensor is mounted on the electronic circuit board by means of a connector, in particular a flexible printed circuit board, so as to enter said cavity. If wished, the cavity may be of a shape which widens from the optical sensor towards the side gap.

For example, the light source capable of illuminating the vial may be arranged so as to emit light towards a base wall of the vial, when the vial is received in the recess. For example, the vial may be intended to be inserted into the recess such that the base wall thereof is opposite the base wall of the recess, the base wall of the recess being pierced by an orifice, and the light source being mounted on the printed circuit board, adjacently to said orifice. If wished, the light source may be a light-emitting diode.

Advantageously, the detection system may comprise an electrical energy source, in particular a rechargeable battery, accumulators or batteries, or indeed a photoelectric cell. If applicable, said electrical energy source is arranged in the compartment of the housing of the acquisition unit.

In another embodiment of the invention, the acquisition unit may be integrated in the diffuser. For example, the diffuser may comprise a housing defining a recess that is intended for receiving the vial, at least in part, and the optical sensor of the acquisition unit is arranged in said housing.

In a preferred embodiment of the invention, the processing unit and the communication unit are integrated in the acquisition unit, for example by being arranged in the housing, and in particular on the electronic circuit board arranged in the compartment of the housing.

If applicable, the acquisition unit may comprise a wireless transmission module arranged so as to transmit said notification to the remote electronic device. According to an example, the wireless transmission module is a module capable of transmitting data according to a wireless communication protocol, in particular a Wi-Fi protocol, or preferably a protocol of the Bluetooth type, or indeed of the Bluetooth Low Energy type. Preferably, the acquisition unit may comprise a control module of the wireless transmission module, the control module being arranged so as to trigger the transmission of said notification to the remote electronic device, during a detection performed by the processing unit.

In an alternative embodiment of the invention, the processing unit is remote from the acquisition unit. For example, the processing unit forms part of a data processing server. If applicable, the acquisition unit may comprise a control module of the wireless transmission module, the control module being arranged so as to trigger the transmission of the image by the transmission module to the processing unit, during acquisition of an image by the optical sensor.

Advantageously, the acquisition unit may comprise at least one sensor which is arranged so as to acquire at least one item of information relating to the surroundings of the diffuser. It may for example be an ambient temperature sensor, a humidity sensor, an air pressure sensor. It is thus possible to collect data relating to the quality of the air in the room where the diffuser is installed.

Advantageously, the acquisition unit comprises a magnetic field sensor which is capable of detecting a magnetic field emitted by a tag, in particular a magnetic tag, applied on the vial. If applicable, the magnetic field sensor may be arranged under the recess which is intended for receiving the vial, for example by being mounted on the electronic circuit board. It is thus understood that the magnetic field sensor makes it possible to detect the presence or absence of a vial in the recess. In a non-limiting manner, the magnetic field sensor may be a Hall effect sensor. If wished, said magnetic field sensor may be a sensor of the NFC or RFID type, which is capable of obtaining identification information of a radio tag or RHO or NFC tag.

Advantageously, the control module may be arranged so as to deactivate the wireless transmission module in the absence of a detection of a magnetic field by the magnetic field sensor. Since the wireless transmission module is particularly energy-consuming, this ensures transmission of the images acquired by the optical sensor only when this is necessary. Alternatively or in addition, the control module may be arranged so as to deactivate the wireless transmission module in the absence of reception of an item of information identifying the vial as being of a given type.

Preferably, the communication unit may be arranged so as to transmit a notification to said remote electronic device only during detection by the processing unit of a filling level of the vial which is below said predetermined threshold. In a variant, the communication unit may be arranged so as to periodically transmit a notification to said remote electronic device, said notification containing the result of the comparison, by the processing unit, of the filling level of the vial that is below said predetermined threshold.

In one embodiment of the invention, the communication unit may be arranged so as to transmit a filling notification to said remote electronic device, depending on the filling level determined, and in particular containing the filling level determined. Advantageously, the communication unit may be arranged so as to transmit a notification to said remote electronic device indicating the need to replace the vial when the filling level determined is below said predetermined threshold, for example when the filling level determined corresponds to the "empty" level. Advantageously again, the communication unit may be arranged so as to transmit a notification to said remote electronic device anticipating the imminent replacement of the vial when the filling level determined is below a second predetermined threshold which is higher than the first threshold, for example when the filling level determined corresponds to an intermediate level between the "empty" level and the full level. If wished, the processing unit may be arranged so as to predict an end of service life of the vial installed in the diffuser, for example by means of filling states of said vial, determined previously, and the communication unit may be arranged so as to transmit a notification to said remote electronic device containing said predicted time duration.

Preferably, the communication unit may be arranged so as to transmit a notification to said remote electronic device containing the charge level of the electrical energy source of the acquisition unit, and optionally information originating from other sensors of the acquisition unit.

The invention also relates to an acquisition unit of a system for detecting a filling state of a diffuser vial according to the invention.

The invention also relates to an assembly consisting of a product diffuser, the diffuser comprising a vial containing said product, and an acquisition unit according to the invention. If applicable, the acquisition unit may be mounted on the diffuser, in particular on the vial. In a variant, the acquisition unit may be integrated in the diffuser.

The invention also relates to a detection system for a diffuser vial, the vial containing a product intended to be diffused, the system comprising an acquisition unit comprising a housing defining a recess that is intended to receive the vial, at least in part, characterized in that the acquisition unit comprises a magnetic field sensor which is capable of detecting a magnetic field emitted by a tag, in particular a magnetic tag, applied on the vial, when the vial is received in the recess. If applicable, the housing may comprise a fixing member for fixing the housing to the diffuser.

Advantageously, the acquisition unit is provided with an optical sensor arranged so as to acquire an image of the vial, and the detection system comprises a processing unit arranged so as to determine a filling level of the vial from said image, and a communication unit arranged so as to transmit a filling notification to a remote electronic device depending on the filling level determined.

BRIEF DESCRIPTION OF THE DRAWINGS

The present invention will now be described with reference to examples, which are given merely by way of example and in no way limit the scope of the invention, and on the basis of the accompanying drawings, in which.

DETAILED DESCRIPTION OF THE INVENTION

In the following description, elements which are identical, in terms of structure or function, are provided with the same reference signs in different figures, unless otherwise specified. Furthermore, the terms "front". "rear", "top", "bottom", "lower" and "upper" should be interpreted in the context of the orientation of the acquisition unit as it has been shown, corresponding to normal use of the detection system, such as when it is mounted on an electrical diffuser plugged into a female electrical wall socket.

Figure 1:
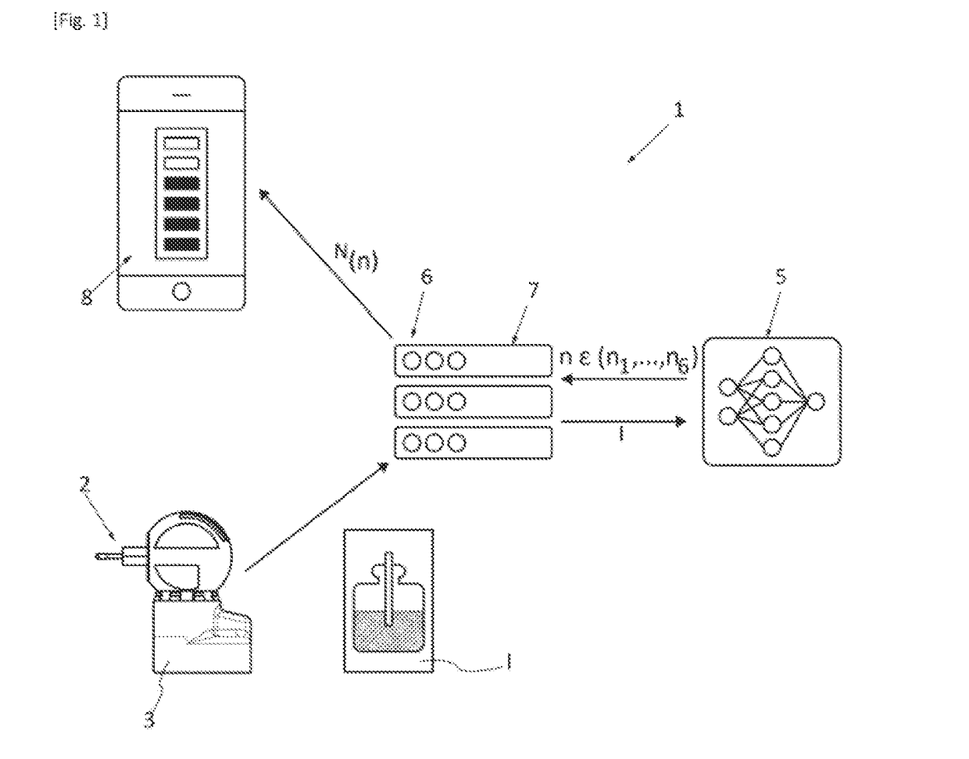
FIG. 1 is a partial schematic view of a system for detecting a filling state of a vial of a diffuser, according to a first embodiment of the invention.

FIG. 1 shows a system 1 for detecting a filling state of a vial of a diffuser 2 according to a first embodiment of the invention, the vial containing a quantity of a product intended to be diffused.

In the example described, without this being limiting, the vial contains a product consisting in a composition based on pheromones, comprising at least one carrier solvent and preferably a mixture of fatty acids and/or of derivatives, for example marketed by the company Ceva Santé Animal under the Trademark Feliway®. Said composition, based on pheromones, is able to be administered to non-human mammals, in particular felines, by diffusion in the ambient air, for treatment of symptoms linked to stress or anxiety in said non-human mammals.

Figure 2:
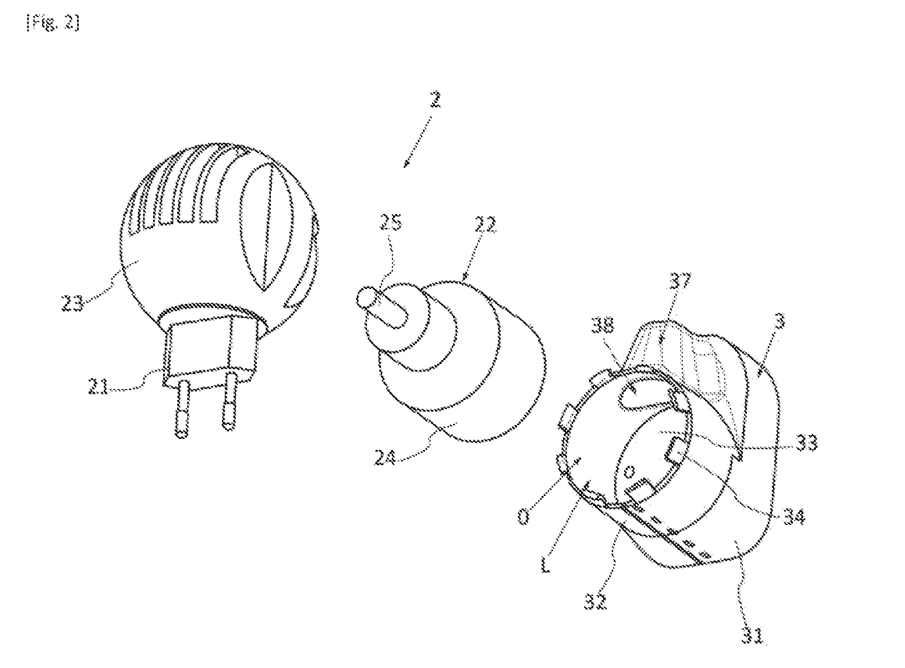
FIG. 2 is a partial schematic exploded view of the diffuser and the acquisition unit of the system of [FIG. 1]
Figure 3:
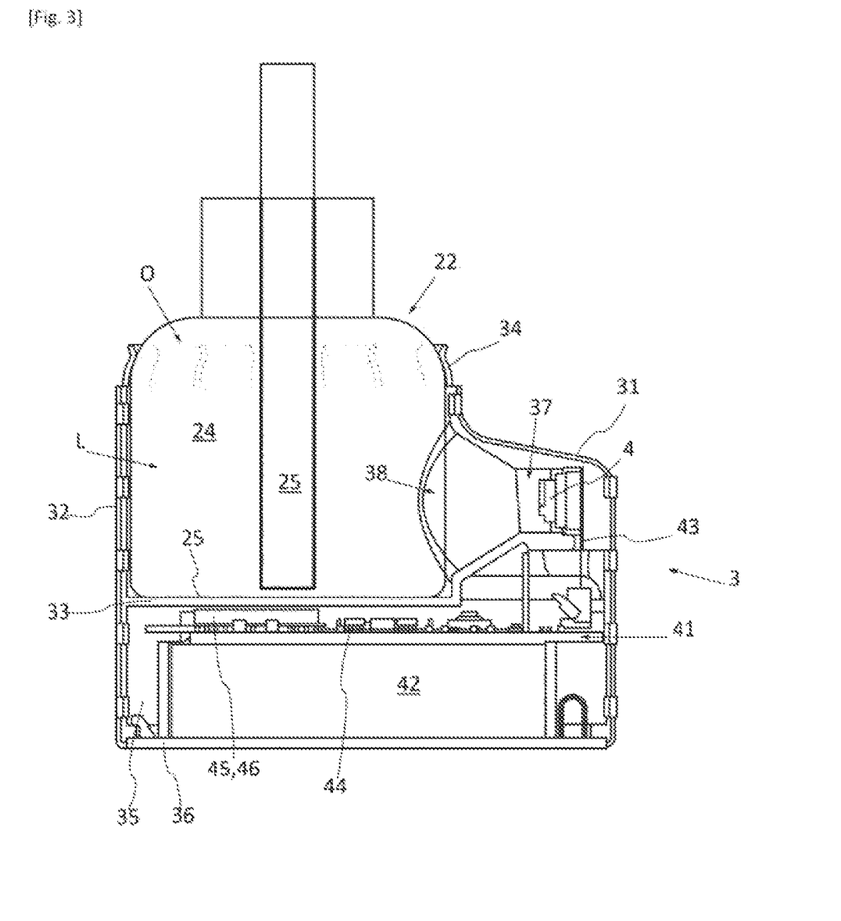
FIG. 3 is a partial schematic cross section of the acquisition unit mounted on the diffuser of [FIG. 2]

The system 1 comprises an acquisition unit 3 which is intended to be mounted on the diffuser 2. [FIG. 2] is an exploded view of the diffuser 2 and the acquisition unit 3, and [FIG. 3] is a cross-section of the diffuser 2 on which the acquisition unit 3 is mounted.

In the example described, without this being limiting, the diffuser 2 is an electrical diffuser, comprising a male electrical plug 21 intended to cooperate with a female electrical wall socket, a diffusion member 23, and a vial 22, which is mounted on the diffusion member such that it can be dismantled, said vial containing the product which is intended to be diffused.

The vial 22 comprises a body 24 having a base wall 25, and a wick 26 arranged in the vial by being plunged into the product in order to cause it to rise, by capillary action, towards the diffusion member 23 of the diffuser 2. The diffusion member 23 comprises a heating resistor (not shown), which is arranged so as to heat when it is electrically powered, and to thus diffuse the product contained in the vial, by evaporation.

The acquisition unit 3 comprises a housing 31 which defines a recess L intended for receiving the vial 22. Said recess L is defined by a substantially cylindrical side wall 32 of the housing 31, which is open at the top and closed at the bottom by a base wall 33. The upper edge of the side wall 32 thus defines an opening O through which the vial 22 can be inserted into the recess L. During normal insertion of the vial 22 into the recess L, the body 24 of the vial is surrounded by the side wall 32, and the base wall 25 of the vial is opposite the base wall 33 of the recess L.

The edge of the side wall 32 comprises a plurality of elastically deformable tabs 34 which are distributed over the periphery of said side wall and together form a fixing member for fixing the acquisition unit 3 on the diffuser 2. In other words, the tabs 33 allow for the vial 22 to be inserted into the recess L. However, once the vial 22 is inserted, the tabs 33 resist the removal of the vial 22 from the recess, such that a force has to be exerted on the vial 22 in order to allow for this removal.

The housing 31 comprises a compartment 35 which is arranged under the base wall 33 of the recess L and in which an electronic circuit board 41 and batteries 42, electrically connected to the circuit board 41, are arranged. A removable cover 36 closes the compartment 34.

The electronic circuit board 41 carries an optical sensor 4, i.e., in the example described, a camera 4. The camera 4 is arranged in a cavity 37 of the housing, being connected to the electronic circuit board 41 by a connector 43, i.e., in the example described, a flexible printed circuit board.

The cavity 37 extends adjacently to the side wall 32, widening towards a side gap 38 formed in said side wall 32. Thus, in this position, the camera 4 can acquire an image of the diffuser 2 in the region of a position corresponding to the position of the vial 22.

The electronic circuit board 41 also carries a light source 44, i.e., in the example described, a light-emitting diode 44. The base wall 33 is pierced by an orifice 37, and the light-emitting diode 44 is mounted on the circuit board 41, below said orifice 37. In this way, the light-emitting diode 44 can illuminate the vial 22 from below, through the base wall 25 thereof, in order to facilitate the acquisition of good-quality images by the camera 4.

The electronic circuit board 41 also carries a control module 45 which integrates a wireless transmission module 46. In the example described, the wireless transmission module 46 is a module capable of transmitting data according to a wireless communication protocol, in particular a Wi-Fi protocol. The control module 45 controls the various elements of the acquisition unit 3, and in particular the camera 4 and the wireless transmission module. More precisely, the control module 45 is arranged so as to trigger the acquisition of an image by the camera 4 in a periodic manner, for example once a day.

The electronic circuit board 41 also carries a plurality of sensors, including sensors capable of acquiring information relating to the surroundings of the diffuser 2, and in particular an ambient temperature sensor, and a Hall effect sensor. In the example described, the various sensors are integrated in the control module 45.

The vial 22 may comprise a magnetic tag, applied for example, on a outside face of the base wall 25 thereof. Since the Hall effect sensor is integrated in the control module 45, it is thus placed under the recess L and can thus detect a magnetic field emitted by said tag. It will thus be understood that said Hall effect sensor makes it possible to detect the presence or absence of a vial in the recess L. In the absence of detection of a vial in the recess L by the Hall effect sensor, the control module 45 can then deactivate the wireless transmission module 46, so as to minimize the energy consumption of the acquisition unit 3.

The continuation of the system 1 will now be described, in connection again with [FIG. 1].

The system 1 comprises a processing unit 5 and a communication unit 6. In the example described, the processing unit 5 and the communication unit 6 are integrated in a data processing server 7 which is remote from the acquisition unit 3.

During use, by a user, of the diffuser 2 on which the acquisition unit 3 is mounted, each image I acquired by the camera 4 is transmitted, by the wireless transmission module 46, to the server 7.

Said image Im is transmitted to the processing unit 5 and undergoes a plurality of pre-processing operations, in particular operations of resizing, subsampling and/or conversion into black and white, which make it possible to simplify the processing of said image Im.

The processing unit 5 is arranged so as to select, from the image I, a filling level of the vial n from a set of predetermined filling levels $\{n_1, \ldots, n_m\}$. In the example described, the assembly comprises seven filling levels, $n_1$ to $n_6$, ranging between an "empty" level, $n_1$, and a "full" level, $n_6$. It should be noted that the processing unit 5 may also determine, from the image I, whether the vial 22 of the diffuser 2 is incorrectly positioned, or indeed whether the diffuser 22 does not comprise a vial.

For these purposes, the processing unit 5 implements a classifier which is capable of classifying the image I from a knowledge base comprising a plurality of classes each comprising one of the filling levels $n_1$ to $n_6$ of said set, as well as the states "incorrectly positioned" or "absent", each class being represented by a tag.

In the example described, the classifier is a neural network which has previously been trained by means of a machine learning algorithm in supervised mode. For example, the hyperparameters of the network, and in particular the initial values of the synaptic weights and the bias values of the different neurons of the network, were established randomly. A set of images of vials having different filling states known in advance was then provided to the classifier, the classifier having been trained to assign each image a tag representing one of the filling levels. For each image, the actual filling level corresponding to this image is then provided to the classifier, such that it can adjust the weight values and bias values. In this way, the classifier itself defines optimal decision rules for said set of images, making it possible to assign class tags to these images.

At the end of the operations implemented by the processing unit 5, the filling level of the vial n thus determined is provided to the communication unit 6.

It should be noted that, during the acquisition of the acquisition unit 3 by the user, said unit was coupled, in the region of the server 7 to a smartphone 8 of the user, which is equipped with a software application for monitoring the filling state of the vial 22.

Upon reception of the level n, the communication unit 6 then transmits a notification N containing said level n to the smartphone 8. The software application can then indicate, to the user, the quantity of product remaining in the vial 22.

In the example described, depending on the value of the level $n_2$, the notification N can contain an alert intended to be transmitted, via the software application, to the user. Thus, if the level n selected by the processing unit 5 is a level less than or equal to a given intermediate level, for example a level $n_2$, the notification N can include a request intended for the user, asking them to plan to replace the vial 22, and offering them a commercial link allowing the to obtain a refill. If the level n selected by the processing unit 5 is the level $n_1$, i.e. the level "empty", the notification N can include a request intended for the user, asking them to replace the vial 22 as soon as possible.

Figure 4:
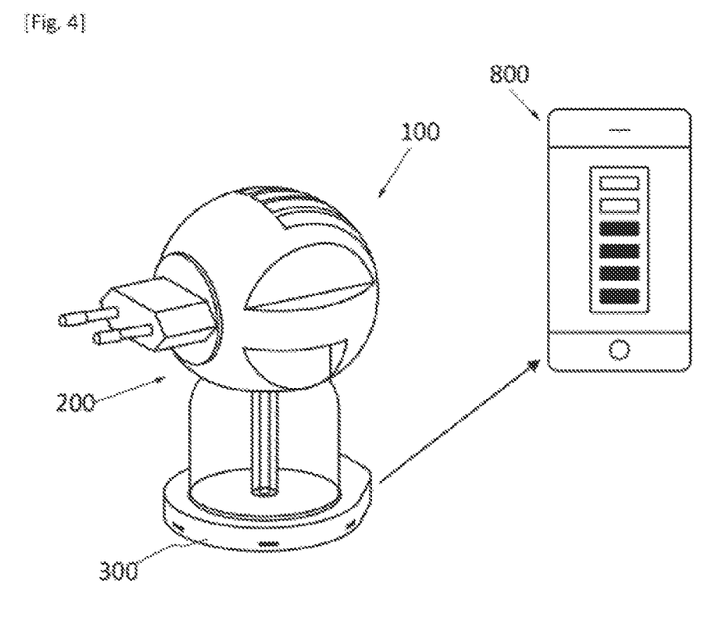
FIG. 4 is a partial schematic view of a system for detecting a filling state of a vial of a diffuser, according to a second embodiment of the invention.

FIG. 4 shows a system 100 for detecting a filling state of a vial of a diffuser 200 according to a second embodiment of the invention, the vial containing a quantity of a product intended to be diffused.

Figure 5:
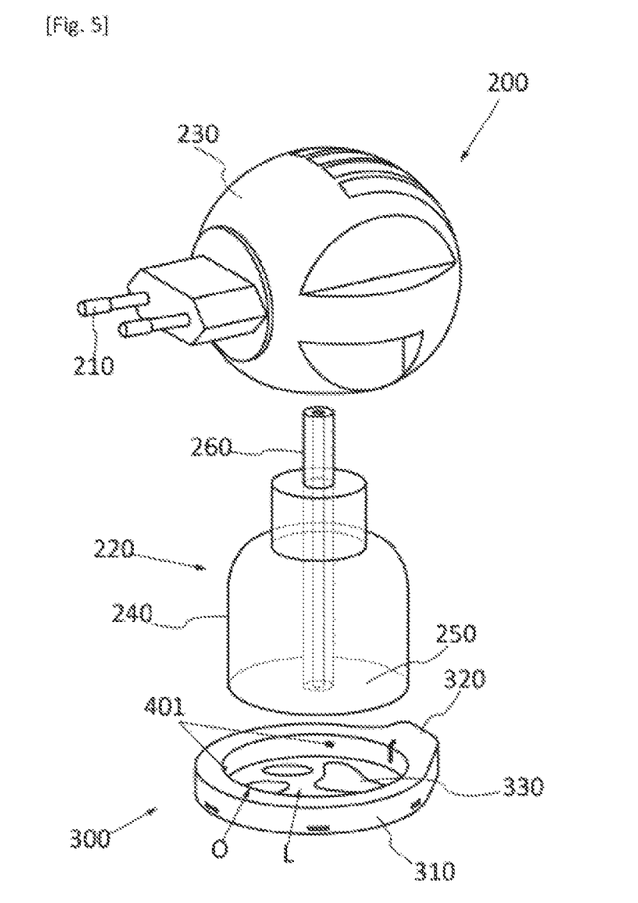
FIG. 5 is a partial schematic exploded view of the diffuser and the acquisition unit of the system of [FIG. 4]
Figure 6:
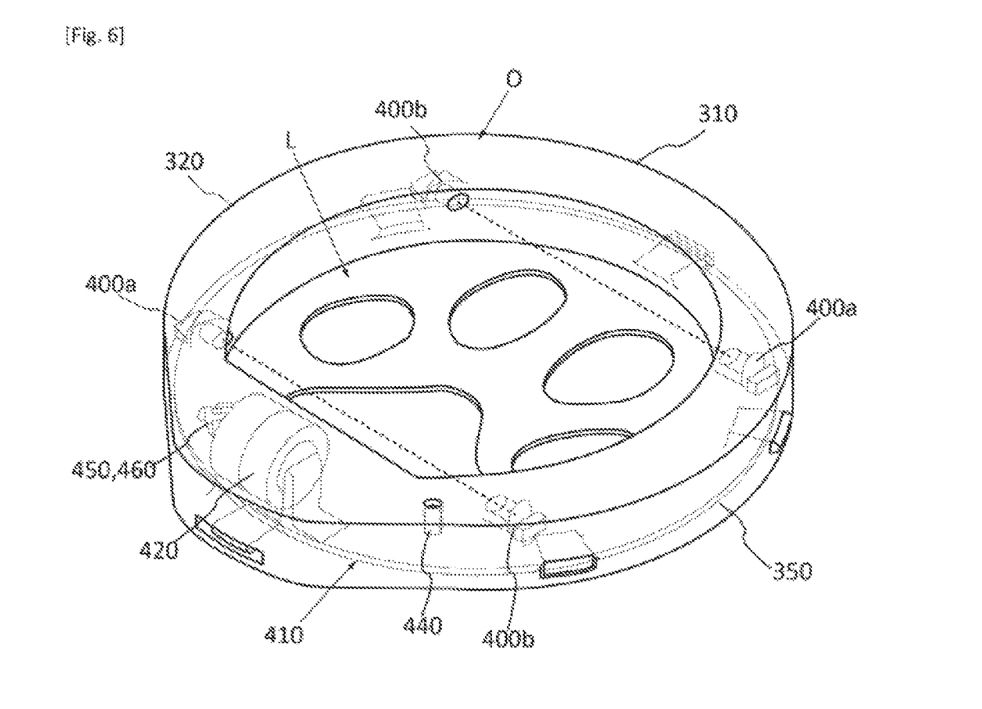
FIG. 6 is a partial schematic perspective view of the acquisition unit of [FIG. 5]

The system 100 comprises an acquisition unit 300 which is intended to be mounted on the diffuser 200. [FIG. 5] is an exploded view of the diffuser 200 and the acquisition unit 300, and [FIG. 6] is a perspective view of the acquisition unit 300.

As in the example of [FIG. 1] to [FIG. 3], the diffuser 200 is an electrical diffuser, comprising a male electrical plug 210 intended to cooperate with a female electrical wall socket, a diffusion member 230, and a vial 220, which is mounted on the diffusion member such that it can be dismantled, said vial containing the product which is intended to be diffused.

The vial 220 comprises a body 240 having a base wall 250, and a wick 260 arranged in the vial by being plunged into the product in order to cause it to rise, by capillary action, towards the diffusion member 230 of the diffuser 200. The diffusion member 230 comprises a heating resistor (not shown), which is arranged so as to heat when it is electrically powered, and to thus diffuse the product contained in the vial, by evaporation.

The acquisition unit 300 comprises a housing 310 which defines a recess L intended for receiving the vial 220. Said recess L is defined by a side wall 320 which forms a ring and is attached to a base wall 330. The upper edge of the side wall 320 thus defines an opening O through which a lower part of the vial 220 can be inserted into the recess L. During normal insertion of the vial 220 into the recess L, the body 240 of the vial is surrounded by the side wall 320, and the base wall 250 of the vial is opposite the base wall 330 of the recess L.

The edge of the side wall 320 is elastically deformable and thus forms a fixing member for fixing the acquisition unit 300 on the vial 220. In other words, said edge deforms in order to allow for the vial 220 to be inserted into the recess L. However, once the vial 220 is inserted, the edge resists the removal of the vial 220 from the recess, such that a force has to be exerted on the vial 220 in order to allow for this removal.

The acquisition unit 300 thus forms an element which is independent of the vial 220 and which can be mounted and dismantled as desired, in particular in order to replace or fill the vial 220.

The side wall 320 forms a hollow ring which thus defines a compartment 350 which extends all around the recess L and in which an electronic circuit board 410 and batteries 420, electrically connected to the circuit board 410, are arranged.

The electronic circuit board 410 carries two optical sensors 400a, i.e., in the example described, two phototransistors 400a which are sensitive to infrared light, as well as two infrared light emitters 400b consisting, in the example described, in two light-emitting diodes. Each sensor 400a and each emitter 400b is thus arranged in the compartment 350 opposite an orifice 401 provided for this purpose in a surface of the side wall 320 located on the side of the recess L.

More precisely, each of the optical sensors 400a is thus arranged opposite one of the emitters 400b. Each sensor 400a thus forms, together with the emitter 400b facing it, a sensor-emitter pair that is arranged on either side of the recess L, the associated orifices 401 corresponding, and the vial 220 thus being interposed between the sensor and the emitter when it is arranged in the recess L. In other words, each emitter 400b is arranged so as to emit an infrared light beam (shown in dotted lines in [FIG. 6]) through the recess L, and thus the vial 220, towards the associated optical sensor 400a.

It will be noted that, on account of the shape of the housing 310 and that of the side wall 320, the sensor-emitter pairs are positioned at the same height with regard to the base wall 330 of the housing, such that they are intended to be just above the base wall 250 of the vial 220. Furthermore, these sensor-emitter pairs are arranged on either side of a diametrical plane of the recess L.

The electronic circuit board 410 also carries a light source 440, i.e., in the example described, a light-emitting diode 440 which is arranged in the compartment 350 and is oriented towards the outside of the housing 310. The side wall 320 is pierced by an orifice, through which the light-emitting diode 440 can emit light.

The electronic circuit board 410 also carries a control module 450, which integrates a microcontroller, as well as a wireless transmission module 460. In the example described, the wireless transmission module 460 is a module capable of transmitting data directly to a smartphone or a tablet 800, according to a wireless communication protocol of the Bluetooth Low Energy type.

The electronic circuit board 410 also carries a plurality of sensors, including sensors capable of acquiring information relating to the surroundings of the diffuser 2, and in particular an ambient temperature sensor, a Hall effect sensor, and an NFC tag reader. In the example described, the various sensors are integrated in the control module 450.

The control module 450 controls the various elements of the acquisition unit 300, and in particular is capable of controlling the emitters 400b and of processing the data generated by the sensors 400a, of controlling the light source 440, and of controlling the activation, the deactivation, and the transmission of data by the wireless transmission module 460.

In a manner equivalent to the embodiment of [FIG. 1] to [FIG. 3], the Hall effect sensor makes it possible to detect a magnetic field emitted by said tag. It will thus be understood that said Hall effect sensor makes it possible to detect the presence or absence of a vial in the recess L. In the absence of detection of a vial in the recess L by the Hall effect sensor, the control module 450 can then deactivate the wireless transmission module 460, so as to minimize the energy consumption of the acquisition unit 3.

The NFC tag reader makes it possible to obtain identification information of the vial 220, if said vial comprises an NFC tag of this kind, and thus to authenticate said vial 220 in order that the control module 450 can authorize or forbid access to one or more functionalities of the system 100, including the diffusion functionality.

The operation of the system 100 will now be described, in connection again with [FIG. 4].

The control module 450 is arranged so as to trigger the emission of an infrared beam, by each of the emitters 400b, in a periodic manner, for example every four hours.

It will be noted that, if the vial 220 comprises enough liquid, the level of the liquid extends above the normal optical pathway of the light beam emitted by one and/or the other of the emitters 400b towards the sensors 400a. From then, one and/or the other of said beams is refracted by the liquid when it passes through the vial, and thus does not reach the associated optical sensor 400a. Vice versa, if the level of the liquid drops below said normal optical pathway of one or other of said light beams, said light beam thus undergoes substantially no deflection and the associated optical sensor 400a receives it. In other words, the current flow that travels between the emitter and the collector of each phototransistor 400a thus depends on the level of liquid in the vial with regard to the position of said phototransistor. It is thus possible for the control module 450, by comparing the current flows of the sensors 400a to a given threshold, to determine whether the liquid level is above or below the position of these sensors. More precisely, if the current flow of one of the sensors 400a is above said given threshold, the control module 450 can then conclude that the vial 220 is virtually empty. If the current flow of each of the sensors 400a is below said given threshold, the control module 450 can conclude, conversely, that the vial 220 still contains enough liquid.

It will thus be noted that, whatever the orientation of the plug 210 and the vial 220, at least one of the sensor-emitter pairs can allow for detection of the filling state of the vial 220. Furthermore, conversely to the embodiment of [FIG. 1] to [FIG. 3], all the operations of the detection system are carried out in the region of the acquisition unit 300, and not in the region of a remote computer server.

Upon detection, by the microcontroller of the control module 450, of an insufficient level of liquid in the vial 220, the control module 450 controls the light source 440 for emission of a light signal indicating that the vial 220 is empty and that it is necessary to replace it or refill it. Simultaneously, the control module 450 controls the wireless transmission module 460 for emission of a notification towards the telephone 800, indicating an empty state of the vial and containing an instruction for filling the vial.

The description above clearly explains how the invention makes it possible to achieve the objects which it addresses, i.e. that of proposing a system which allows a user of a diffuser to be able to replace the diffuser vial when it is empty, and to be able to order a refill before the vial is empty, in order to allow for continuous use of the diffuser, by providing for adding, to the diffuser, an acquisition unit for acquiring an image of the vial, processing said image by means of a processing unit in order to determine the quantity of product remaining in the vial, and providing a notification of said quantity to said user.

In any event, the invention is not limited to the embodiments specifically described in this document, and extends in particular to all equivalent means and to any technically possible combination of said means. It is possible in particular to consider equipping other types of diffusers than that described, and in particular ultrasound diffusers, or indeed non-electrical diffusers, or also diffusers associated with other types of products than compositions based on pheromones, and in particular diffusers for insecticide, insect repellant, disinfectant, antiseptic, mold inhibitor, fragrance, essential oil, odor eliminator, or air freshener. It could also be provided for the acquisition unit to be integrated into the diffuser. Solutions other than that cited could also be provided which allow for the processing unit to determine a filling level of the vial, and in particular other types of classifiers, or indeed a regressor or even an image processing algorithm. It is also possible to envisage the use of types of optical sensors other than that described, and in particular a sensor based on an emitter-receiver which operates in a wavelength different from infrared.

What is claimed is:

1. A system (1, 100) for detecting a filling state of a vial (22, 220) of a diffuser (2, 200), the vial containing a product intended to be diffused, the system comprising an acquisition unit (3, 300) provided with an optical sensor (4, 400a) intended to be arranged opposite the vial in order to acquire at least one light beam that has passed through the vial, a processing unit (5, 450) designed to detect, from said light beam, whether a filling level (n) of the vial is lower than a predetermined threshold, and a communication unit (6, 460) designed to send a notification (N) regarding said filling level to a remote electronic device (8, 800) depending on said detection, wherein the acquisition unit (3, 300) comprises a pair of infrared light sensors (400a) intended to be arranged opposite the vial (2, 200) in two different locations, but at a same height, and a pair of infrared light emitters (400b), each intended to be arranged opposite the vial facing one of the infrared light sensors (400a), and arranged so as to emit at least one infrared light beam through the vial towards said corresponding optical sensor (400a), and wherein said processing unit (5, 450) is arranged to determine that the filling level of the vial (2, 200) is below said predetermined threshold when one optical sensor (400a) of said pair of infrared light sensors (400a) receives said infrared light beam.

2. The detection system (100) according to claim 1, wherein the pair of infrared light emitters (400b) and the pair of infrared light sensors (400a) are intended to be arranged opposite a side wall of the vial (220) and adjacently to a lower wall (250) of the vial.

3. The detection system (100) according to claim 1, wherein the acquisition unit (300) comprises two pairs of infrared light sensors (400a) intended to be arranged opposite the vial (220) in two different locations, the infrared light sensors (400a) of a same pair being intended to be positioned in two different locations but at a same height, and two pairs of infrared light emitters (400b) each infrared light emitter (400b) being intended to be arranged opposite the vial facing a corresponding infrared light sensor (400a), and configured to emit at least one infrared light beam through the vial towards said corresponding infrared light sensor (400a).

4. The detection system (1, 100) according to claim 1, the acquisition unit comprising a housing (31, 310) defining a recess (L) that is intended to receive the vial (22, 220), at least in part, and comprising a fixing member (34, 320) for fixing the housing to the diffuser (2, 200), the optical sensor (4, 400a) being arranged in the housing so as to be opposite a side wall of the vial when the vial is received in the recess.

5. The detection system (1, 100) according to claim 4, wherein the housing (31, 310) comprises a peripheral wall (32, 320) which laterally delimits the recess (L), said peripheral wall comprising a side gap (38, 401), the pair of infrared light sensors (4, 400a) being arranged in the housing, opposite said gap.

6. The detection system (100) according to claim 5, wherein the processing unit (450) and the communication unit (460) are integrated in the acquisition unit (300).

7. The detection system (1, 100) according to claim 1, wherein the acquisition unit (3, 300) comprises at least one sensor which is arranged so as to acquire at least one item of information relating to surroundings of the diffuser (2, 200).

8. The detection system (1, 100) according to claim 1, wherein the acquisition unit (3, 300) comprises a magnetic field sensor which is capable of detecting a magnetic field emitted by a tag applied on the vial (22, 220).

9. The detection system (1, 100) according to claim 8, wherein the acquisition unit (3, 300) comprises a control module (45, 450) of the communication unit (46, 460), the control module being arranged so as to deactivate the communication unit in the absence of a detection of a magnetic field by the magnetic field sensor.

10. An acquisition unit (3, 300) of a system (1, 100) for detecting a filling state of a vial (22, 220) of a diffuser (2, 200) according to claim 1.

11. An assembly consisting of a product diffuser (2, 200), the diffuser comprising a vial (22, 220) containing said product, and an acquisition unit (3, 300) according to claim 10.

* * * * *